May 28, 1940.  T. HALGRIMSON  2,202,450
DIGGER IMPLEMENT
Filed Jan. 7, 1939  2 Sheets-Sheet 1
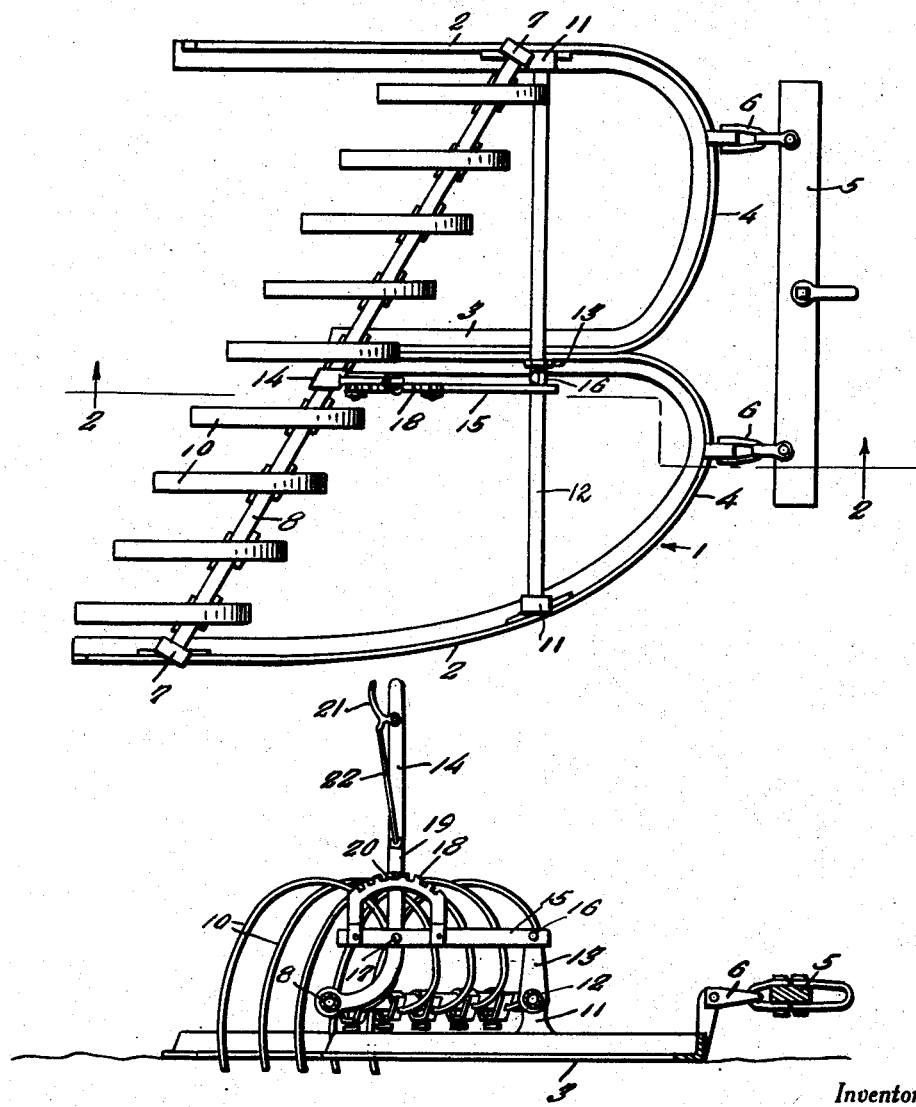

May 28, 1940.  T. HALGRIMSON  2,202,450
DIGGER IMPLEMENT
Filed Jan. 7, 1939  2 Sheets-Sheet 2

Inventor
Theodore Halgrimson
By Clarence A. O'Brien
and Hyman Berman
Attorneys

Patented May 28, 1940

2,202,450

UNITED STATES PATENT OFFICE 2,202,450

DIGGER IMPLEMENT

Theodore Halgrimson, Fountain, Minn.

Application January 7, 1939, Serial No. 249,801

1 Claim. (Cl. 55—104)

My invention relates to improvements in ground working implements, and more particularly to so-called "quack" diggers.

The principal object of the invention is to provide a simply constructed implement of the class above identified, which is more efficient in operation than those now of commerce and which is arranged to deliver to one side and for digging at different depths.

Other and subordinate objects are also comprehended by my invention, all of which, together with the precise nature of my improvement, will be readily understood when the succeeding description and claim are read with reference to the drawings accompanying and forming part of this specification.

In said drawings:

Figure 1 is a view in top plan of a preferred form of my improved implement.

Figure 2 is a view in section taken on the line 2—2 of Figure 1 looking in the direction indicated by the arrows.

Figure 3:
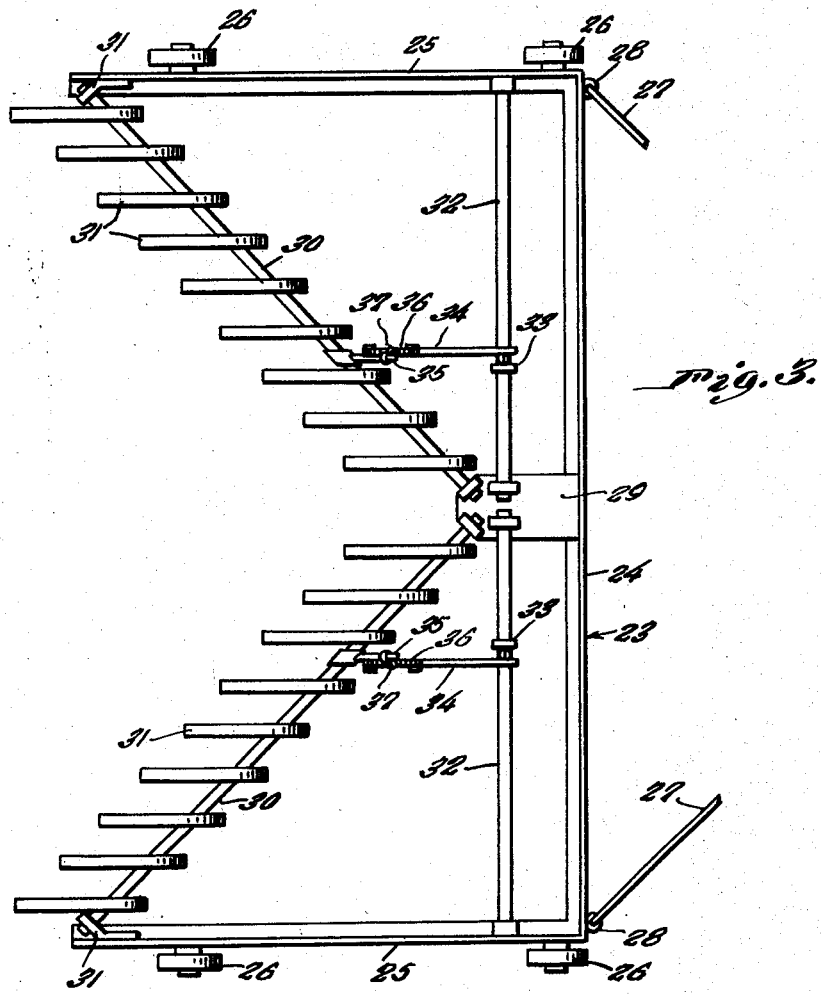
Figure 3 is a view in top plan of a modified form of my improved implement.
Figure 4:
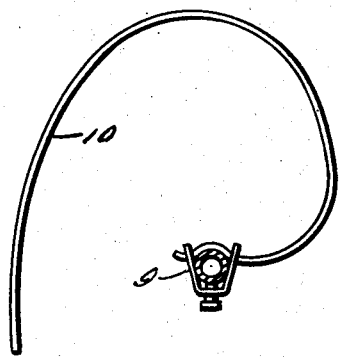
Figure 4 is a view in side elevation of one of the tines and the clip for attaching the same to its rock shaft.

Referring to the drawings by numerals, and first to Figures 1 and 2, my improved implement, in its preferred form, comprises a drag frame 1 formed of a single piece of angle iron bent upon itself to provide a pair of right and left hand side runners 2, and an intermediate shorter runner 3, together with a pair of arched front portions 4 connecting said runners 2 to the intermediate runner 3. A double tree 5 is connected by a pair of clevis and link couplings 6 to said front portions, respectively, for attachment to a tractor or the like in any suitable manner. A pair of bearing brackets 7 upstanding from the runners 2, respectively, support a rock shaft 8 extending diagonally across said frame 1 and inclining rearwardly toward the right hand runner 2. The rock shaft 8 has clipped thereto, as at 9, a plurality of trailing digger tines 10 of the usual convolute spring metal type spaced apart laterally and equidistantly in planes oblique to the axis of said shaft so as to dispose the same parallel with the runners 2 and 3. Another pair of bearing brackets 11 on said runners 2, respectively, support a transverse rock shaft 12 extending across the frame at a right angle to the runners 2 and 3 and provided intermediate its ends with an upstanding crank arm 13 fast thereon. The shaft 8 has fast thereon an upstanding hand lever 14. A link 15 is loosely pivoted at one end, as at 16, to the crank arm 13 for universal swinging thereof and similarly pivoted adjacent its opposite end, as at 17, to the hand lever 14, said link having upstanding therefrom alongside said lever 14 an arcuate toothed detent rack 18. The hand lever 14 has slidably mounted thereon, in the case 19, the usual type of spring-pressed detent bolt 20 for engagement with the rack 18 and operative to disengage said rack by means of the usual pivoted hand grip 21 on the upper end of said lever 14 and a link connection 22 between said grip and bolt.

As will be seen, by adjusting the hand lever 14 forwardly and rearwardly, the shaft 8 may be rocked to adjust the depth of the tines 10 in the ground, as desired, and said lever, shaft and tines, 6 held in adjusted position by coaction of the detent bolt 20 with the rack 18. The described runners 2, 3 and the front arched portions 4 provide for holding the frame 1 to the ground against skidding sidewise and the diagonal arrangement of the shaft 8 and tines 10 for throwing the diggings to the right hand side of the frame 1.

In the modified form of the invention shown in Figure 3, the frame 23 has a straight front bar 24 and parallel right and left hand side bars 25 extending at right angles from the front bar 24 and all formed in one piece of angle iron, the side bars 25 being supported by front and rear pairs of rollers 26 suitably mounted on said bars 25. Draft rods 27, pivoted, as at 28, to the front bar 24 provide for coupling the implement to draft means. The front bar 24 has extending rearwardly and centrally therefrom a bearing bracket 29 functioning as a support for the front ends of a pair of rearwardly diverging horizontally disposed rock shafts 30 journaled at their rear ends in bearing brackets 31 on the side bars 25. The rock shafts 30 have fixed thereto, respectively, a plurality of trailing tines 31' clipped to the shafts in the same manner as described with reference to the preferred form of the invention and of the same type as described relative to said form. The tines 31' are spaced apart laterally and equidistantly along the related shafts 30 to extend rearwardly at an angle to the shafts so that all the tines are parallel with the side bars 25. The means for adjusting the tines 31, in this form of the invention, comprises a pair of transverse shafts 32 journaled end to end in the bracket 29 and side bars 25, respectively, at right angles to the bars 25 and having a pair of crank arms 33 upstanding therefrom, each arm 33 being loosely connected by a link 34 with a hand lever 35 upstanding from one of the shafts 30, said links 34 carrying segments 36 for cooperation with detents represented at 37, all as described with reference to the preferred form of the invention.

In the described modified form of the invention, the V-shaped arrangement of the rock shafts 30 and tines 31' provides for throwing the diggings to both sides of the implement, and the shafts 30 may be independently adjusted through manipulation of the proper hand lever 35 so that the tines 31' thereon may be differently adjusted in the ground as desired.

The foregoing will, it is believed, suffice to impart a clear understanding of my invention without further explanation.

Manifestly, my invention as set forth, is susceptible of modification in other respects than described and right is herein reserved to such other modification as fall within the scope of the subjoined claim.

What I claim is:

In a ground working implement of the class described, a bar-like frame having an open rear end, digger means on said frame comprising a rock shaft mounted on the frame to extend diagonally across the same, a plurality of convolute digger tines fixed to said shaft in laterally spaced relation for variable adjustment in the ground under rocking of said shaft, said tines trailing from the shaft in planes at oblique angles to the axis of the shaft, and means to rock said shaft including a second rock shaft journaled on said frame at a normal angle to the sides of the frame, a crank arm upstanding from said second shaft, a hand lever fixed to and upstanding from the first-mentioned rock shaft, a link pivotally connected adjacent opposite ends thereof to said arm and lever, respectively, a toothed detent segment upstanding from the link alongside said lever, and a detent bolt on said lever engageable with the teeth of said rack at will.

THEODORE HALGRIMSON.